US010460552B2

(12) United States Patent
Miller, Sr. et al.

(10) Patent No.: US 10,460,552 B2
(45) Date of Patent: Oct. 29, 2019

(54) EDGE-LIT REELS FOR WAGERING GAMING MACHINES

(71) Applicant: BALLY GAMING, INC., Las Vegas, NV (US)

(72) Inventors: Charles R. Miller, Sr., Henderson, NV (US); Michael D. Owens, Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 798 days.

(21) Appl. No.: 14/831,157

(22) Filed: Aug. 20, 2015

(65) Prior Publication Data

US 2017/0053477 A1 Feb. 23, 2017

(51) Int. Cl.

| | |
|---|---|
| ***A63F 13/00*** | (2014.01) |
| ***G07F 17/32*** | (2006.01) |
| ***G07F 17/34*** | (2006.01) |

(52) U.S. Cl.

CPC .......... *G07F 17/3213* (2013.01); *G07F 17/34* (2013.01)

(58) Field of Classification Search

CPC .......................... G07F 17/3213; G07F 17/3216

See application file for complete search history.

(56) References Cited

U.S. PATENT DOCUMENTS

| | | | | |
|---|---|---|---|---|
| 5,472,197 | A | 12/1995 | Gwiasda et al. | 273/143 R |
| D404,084 | S | 1/1999 | Hedrick et al. | D21/370 |
| 6,027,115 | A | 2/2000 | Griswold et al. | 273/143 R |
| 6,206,781 | B1 | 3/2001 | Sunaga et al. | 463/20 |
| 6,439,994 | B2 | 8/2002 | Tsukahara | 463/20 |
| 7,220,181 | B2 | 5/2007 | Okada | 463/32 |
| 7,234,697 | B2 | 6/2007 | Okada | 273/143 R |
| 7,520,812 | B2 | 4/2009 | Okada | 463/31 |
| 7,594,852 | B2 | 9/2009 | Rasmussen | 463/20 |
| 8,007,360 | B2 | 8/2011 | Kishi | 463/20 |
| 8,105,161 | B2 | 1/2012 | Rasmussen | 463/31 |
| 8,241,121 | B2 | 8/2012 | Tanimura et al. | 463/31 |
| 8,337,286 | B2 | 12/2012 | Imura | 463/16 |

(Continued)

FOREIGN PATENT DOCUMENTS

| | | | |
|---|---|---|---|
| EP | 921503 | A1 | 6/1999 |
| EP | 1173261 | B9 | 1/2005 |

(Continued)

*Primary Examiner* — Omkar A Deodhar
*Assistant Examiner* — Eric M Thomas
(74) *Attorney, Agent, or Firm* — Marvin A. Hein

(57) ABSTRACT

A gaming system includes at least one reel mechanism for a gaming machine. Each reel mechanism comprises a rotatable cylindrical reel basket, a light shield, and one or more light boards having first and second stationary light sources affixed thereon. The reel basket has first and second opposing light-diffusing rims and a symbol-bearing reel strip extending between the rims. The first and second stationary light sources are positioned to illuminate the first (and second) rim with first light and the reel strip with second light, respectively. The first and second light sources are positioned on opposite sides of a light shield. The light shield is positioned along and inside the first rim and inhibits the first light from illuminating a symbol-bearing region of the reel strip. A light guide is positioned between the first light sources and the first rim to maximize the flow of first light to the first rim.

20 Claims, 10 Drawing Sheets

(56) References Cited

U.S. PATENT DOCUMENTS

| | | | | |
|---|---|---|---|---|
| 8,353,766 | B2 | 1/2013 | Okada | 463/31 |
| 8,480,474 | B2 | 7/2013 | Randall et al. | 463/20 |
| 8,556,730 | B2 | 10/2013 | Jo | 463/46 |
| 8,968,072 | B2 | 3/2015 | Osawa et al. | 463/20 |
| 8,974,298 | B2 | 3/2015 | Kearns et al. | 463/31 |
| 9,039,529 | B2 | 5/2015 | Lanning et al. | 463/34 |
| 9,053,612 | B2 | 6/2015 | Kondo et al. | |
| 9,076,285 | B2 | 7/2015 | Loose et al. | |
| 2003/0087688 | A1 | 5/2003 | Kato | 463/20 |
| 2004/0053674 | A1* | 3/2004 | Nguyen | G07F 17/3202 463/20 |
| 2004/0209667 | A1* | 10/2004 | Emori | G07F 17/3211 463/20 |
| 2007/0232380 | A1 | 10/2007 | Vallejo | 463/20 |
| 2009/0017903 | A1 | 1/2009 | Mizoguchi et al. | 463/20 |
| 2009/0143134 | A1 | 6/2009 | Anderson et al. | 463/20 |
| 2009/0149242 | A1* | 6/2009 | Woodard | G07F 17/3211 463/21 |
| 2012/0034967 | A1* | 2/2012 | Owen | G07F 17/3211 463/20 |
| 2013/0196736 | A1 | 8/2013 | Thoeni et al. | 463/20 |
| 2013/0288773 | A1 | 10/2013 | Kondo et al. | 463/20 |
| 2013/0288806 | A1 | 10/2013 | Kondo et al. | 463/46 |
| 2013/0288807 | A1 | 10/2013 | Kondo et al. | 463/46 |
| 2013/0310143 | A1 | 11/2013 | Kondo et al. | 463/20 |
| 2014/0080574 | A1 | 3/2014 | Stewart et al. | 463/20 |
| 2014/0312565 | A1 | 10/2014 | Sato et al. | 273/142 R |
| 2014/0339767 | A1 | 11/2014 | Hirato | 273/143 R |
| 2014/0339768 | A1 | 11/2014 | Kitamura et al. | 273/143 R |
| 2015/0105149 | A1 | 4/2015 | Crivelli et al. | 463/31 |

FOREIGN PATENT DOCUMENTS

| | | | |
|---|---|---|---|
| EP | 1571614 | A1 | 9/2005 |
| EP | 1571623 | A1 | 9/2005 |
| EP | 1571613 | B1 | 5/2006 |
| EP | 1571625 | B1 | 1/2007 |
| EP | 1571626 | B1 | 8/2007 |
| EP | 1424663 | B1 | 7/2008 |
| WO | WO 1999/060498 | A1 | 11/1999 |
| WO | WO 2004/025586 | A1 | 3/2004 |
| WO | WO 2006/124976 | A1 | 11/2006 |

* cited by examiner

EDGE-LIT REELS FOR WAGERING GAMING MACHINES

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming systems, apparatus, and methods and, more particularly, to reels and other rotating devices that are configured to have edges that emit light.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

Thus, aesthetics and visual appearance are important to improve gaming machine appeal and increase player interaction with a particular gaming machine. Further, when in use, the gaming machine may use electronically controlled lighting effects, in combination with one or more reels or wheels in motion, to improve the perceived visual aspects of the machine and enhance the overall player experience.

SUMMARY OF THE INVENTION

According to one aspect of the present invention, a reel mechanism for a gaming machine is disclosed. The reel mechanism includes a rotatable cylindrical basket, a set of first rim lights, a set of symbol lights, and a stationary light shield. The rotatable cylindrical basket includes first and second opposing light-diffusing rims and a symbol-bearing reel strip extending between the rims. The set of first rim lights are arranged to illuminate the first light-diffusing rim, and the set of symbol lights are arranged to illuminate a symbol-bearing region of the reel strip. The stationary light shield is positioned between the set of first rim lights and the set of symbol lights, and is arranged to isolate the first rim lights and the first rim from the symbol lights and the symbol-bearing region of the reel strip.

According to another aspect of the present invention, a reel mechanism for a gaming machine is disclosed. The reel mechanism includes at least one reel basket, at least one light board, and a basket-edge light shield. The at least one reel basket is rotatable about an axis of rotation. The basket includes a rim and a symbol-bearing reel strip. The rim includes a light-transmissive internal member and a light-diffusing external member. The reel strip has an edge affixed within a channel defined between the internal member and the external member. The at least one light board includes a plurality of outboard light sources and a plurality of inboard light sources. The inboard light sources are arranged to illuminate a symbol-bearing region of the reel strip. The outboard light sources are arranged to illuminate the external member of the reel basket via the internal member and the edge of the reel strip. The basket-edge light shield is positioned between the inboard light sources and the outboard light sources. The light shield inhibits light from the outboard light sources from illuminating the symbol-bearing region of the reel strip.

According to another aspect of the present invention, a regulated casino gaming machine is primarily dedicated to playing at least one casino wagering game. The gaming machine comprises a gaming cabinet and a plurality of reel mechanisms housed within the cabinet. Each reel mechanism comprises a rotatable cylindrical basket, a light shield, a set of first rim lights, and a set of symbol lights. The rotatable cylindrical basket includes first and second opposing light-diffusing rims and a symbol-bearing reel strip extending between the rims. The first rim lights are arranged to illuminate the first light-diffusing rim and the symbol lights are arranged to illuminate a symbol-bearing region of the reel strip. The first rim lights and the symbol lights are positioned on opposite sides of the light shield. The light shield is stationary, positioned between the first rim lights and the symbol lights, arranged to isolate the first rim lights and the first rim from the symbol lights and the symbol-bearing region of the reel strip.

Additional aspects of the invention will be apparent to those of ordinary skill in the art in view of the detailed description of various embodiments, which is made with reference to the drawings, a brief description of which is provided below.

Figure 1:
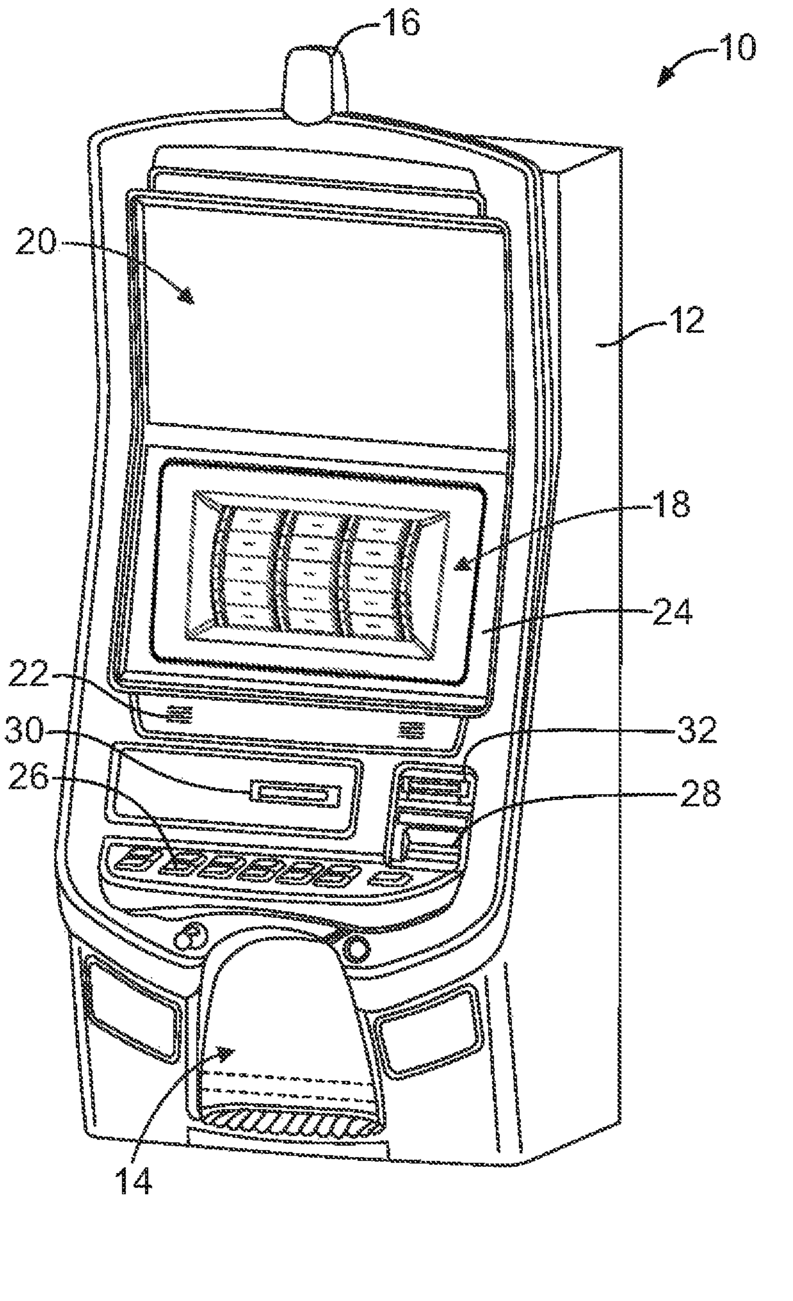
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc., coupled to or containing one or more movable components such as a mechanical reel or wheel. The gaming machine 10 may take any suitable form, such as floor-standing models as shown, bartop models, workstation-type console models, etc. Further, the gaming machine 10 may be primarily dedicated for use in playing wagering games, or may include non-dedicated devices, such as mobile phones, personal digital assistants, personal computers, etc., that are configured to remotely control the operation of a machine with mechanical, moving component(s). Exemplary types of gaming machines are disclosed in U.S. Pat. No. 6,517,433, U.S. Pat. No. 7,137,885, U.S. Pat. No. 8,057,303, U.S. Pat. No. 8,226,459, and U.S. Pat. No. 8,684,808, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary display 18, a secondary display 20, and one or more audio speakers 22. The primary display 18 or the secondary display 20 may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 24 mounted over the primary or secondary displays, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. The value input devices are used to deposit cash or credits onto the gaming machine 10. The cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. The value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
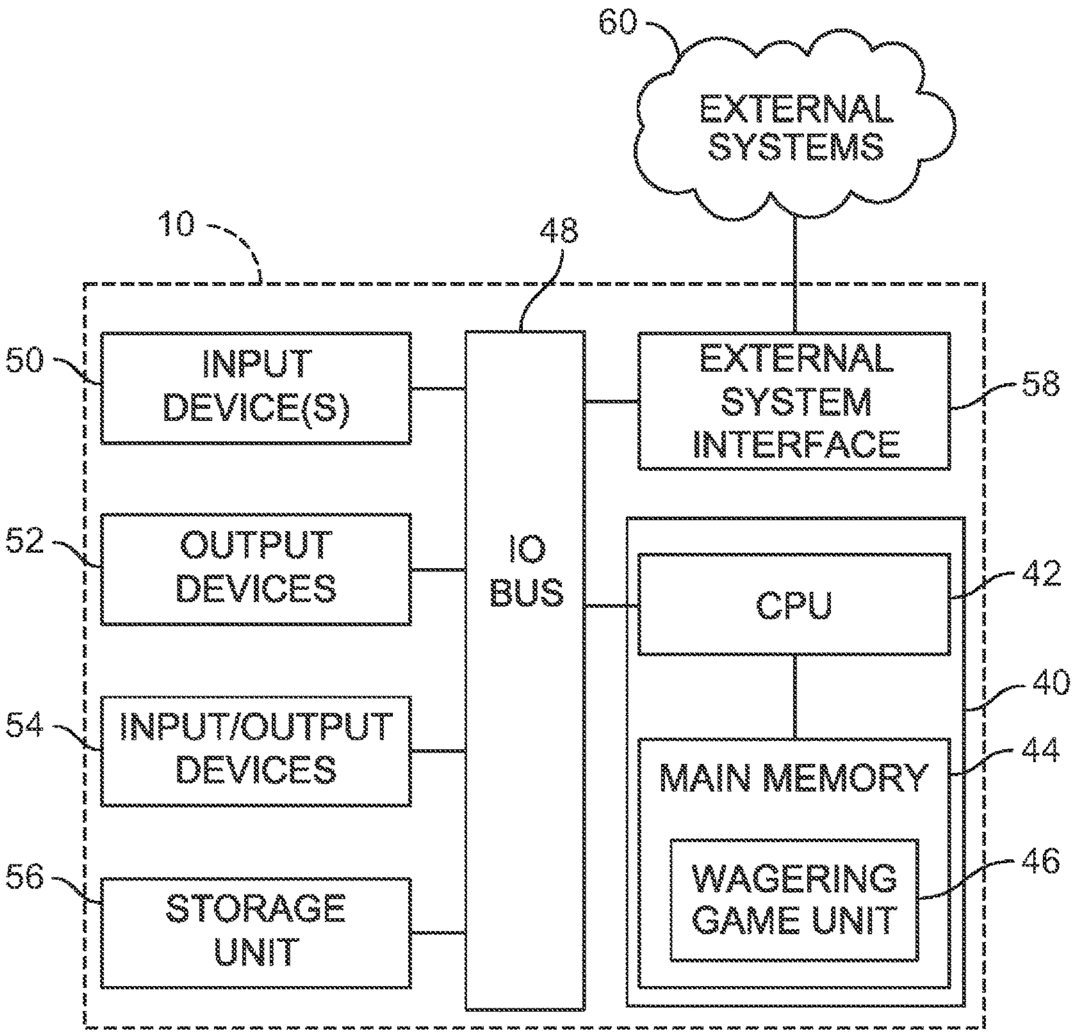
FIG. 2 is a schematic view of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video blackjack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RING), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compares it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
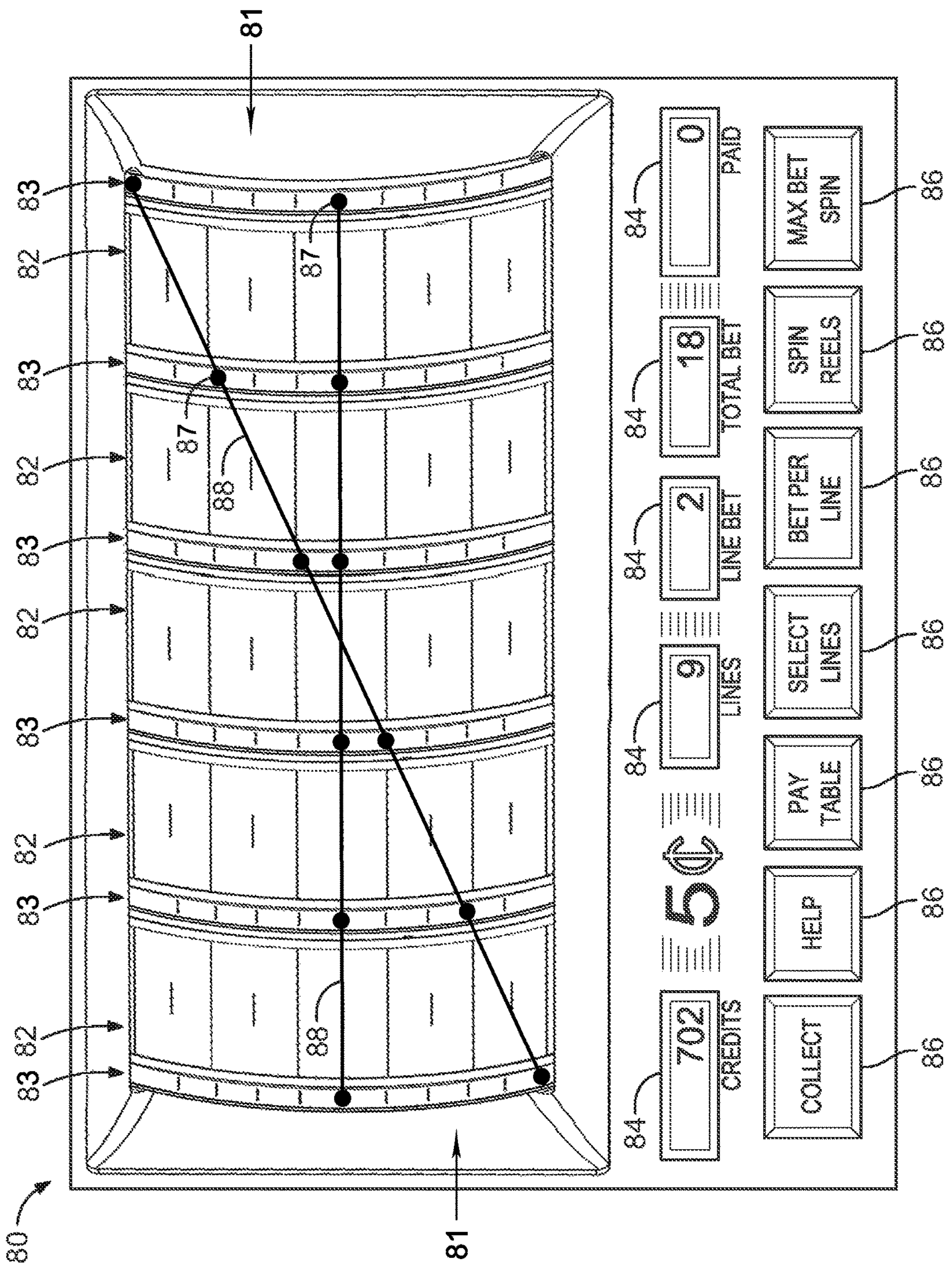
FIG. 3 is an image of an exemplary basic-game visible interface of a wagering game displayed on a gaming machine, according to an embodiment of the present invention.

Referring now to FIG. 3, there is illustrated an image of a basic-game screen 80 adapted to be displayed on the primary display 18 or the secondary display 20. The basic-game screen 80 portrays a plurality of symbol-bearing reels 82 and a plurality of dividers 83, optionally encased within a bezel 81. The bezel 81 may shield the view of mechanical components of the reel(s), internal lighting components, or other components internal to the screen 80 and/or gaming machine 10, etc.

Alternatively or additionally, the basic-game screen 80 portrays a plurality of mechanical reels or other video or mechanical presentation consistent with the game format and theme. The basic-game screen 80 also advantageously displays one or more game-session credit meters 84 and various touch screen buttons 86 adapted to be actuated by a player. The meters 84 and buttons 86 may be additionally or alternatively presented on another display device. A player can operate or interact with the wagering game using these touch screen buttons or other input devices such as the buttons 26 shown in FIG. 1. The game-logic circuitry 40 operates to execute a wagering-game program causing the primary display 18 or the secondary display 20 to display features of the wagering game, visual presentation related to the wagering game, etc.

In response to receiving an input indicative of a wager, the reels 82 are rotated and stopped to place symbols on the reels in visual association with paylines such as paylines 88. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

The paylines 88 may be visually indicated to the player using a plurality of light emitting diodes (LEDs) 87 on one or more dividers 83 (or alternatively, one or more edges of the reels 82). In one embodiment, while the reels 82 rotate (and stop) to indicate a set of symbols used to construct a symbol-array outcome for the wagering game, the dividers 83 do not rotate and remain stationary during and after the rotation of the reels 82. Likewise, the component LEDs 87 of the dividers 83 do not move, instead indicating specified paylines 88 by activating and deactivating corresponding LEDs 87 to indicate the payline(s) 88 being highlighted. One or more paylines 88 may be individually or collectively specified using various techniques of activating and deactivating the LEDs 87.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 18 or secondary display 20) through the display of information such as, but not limited to, text, graphics, static images, moving images, etc., or any combination thereof. In accord with the method of conducting the wagering game, the game-logic circuitry 40 transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary display 18, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter. In one embodiment, the random numbers are used to determine specific stop values for each of the reels 82 that correspond to reel positions for displaying specific symbols on the reel strips for the corresponding reel when stopped. Thus, the symbol(s) displayed by each of the reels 82 can be accurately determined and payline payouts can be tabulated and highlighted using payline indicators on a series of adjacent dividers 83.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

Figure 4:
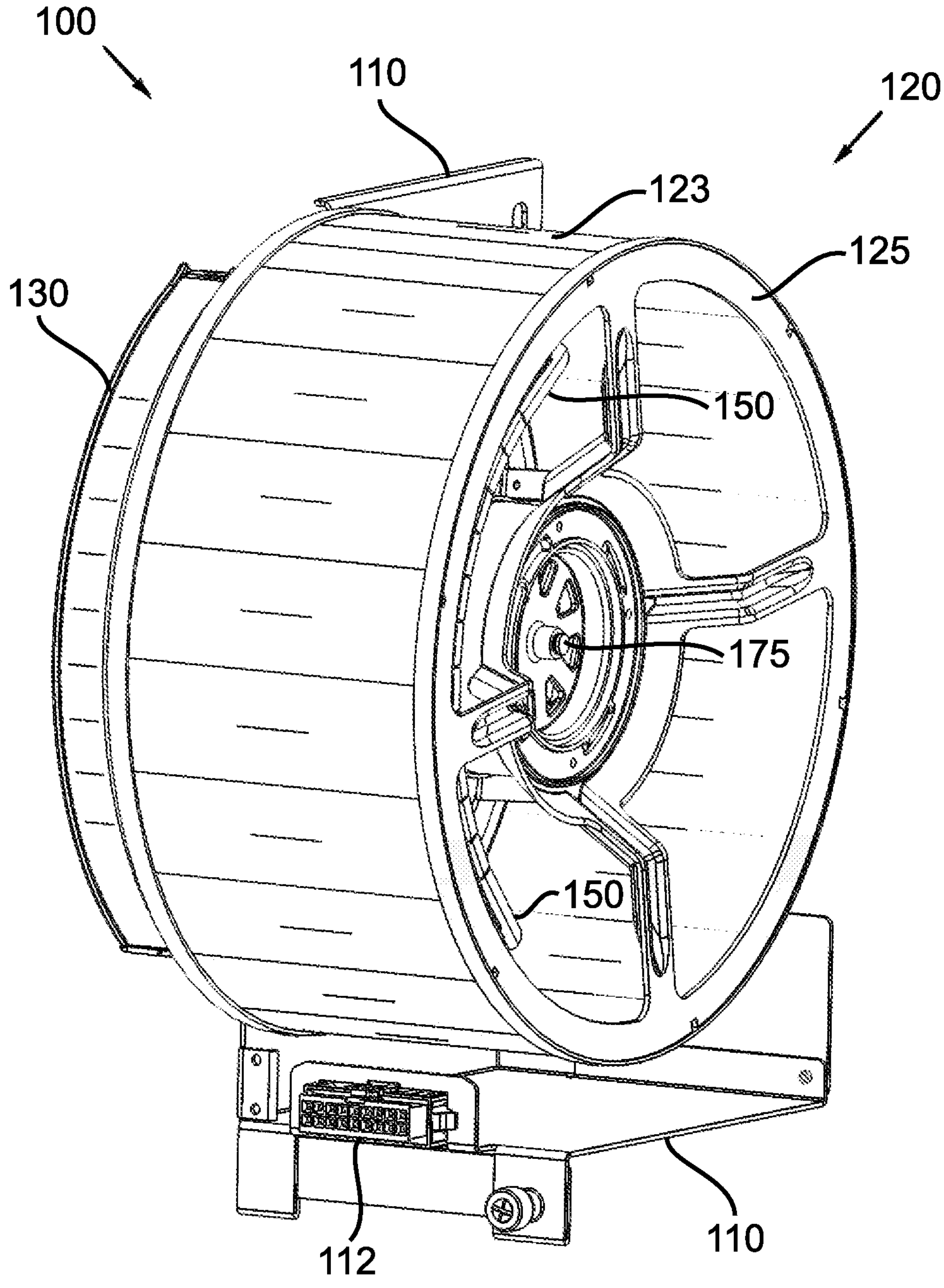
FIG. 4 is a perspective view of a modular reel mechanism of a gaming machine, according to an embodiment of the present invention.

Referring now to FIG. 4, a perspective view of a modular reel mechanism 100 is shown in accordance with one embodiment. The reel mechanism 100 includes a frame 110, wherein a reel assembly 120, a divider 130, and a light board 150 are affixed to the frame 110. The frame 110 includes a port 112 for electrically coupling the reel assembly 120 to electronic components of the gaming machine 10 (e.g., the game-logic circuitry 40). By using electrical signals, the game-logic circuitry 40 can control the motion and lighting components of the reel mechanism 100.

The reel assembly 120 includes a rotatable cylindrical reel basket 125 having a symbol-bearing reel strip 123 rigidly affixed thereto. As the reel basket 125 moves about an axis of rotation defined by a shaft 175 (affixed to a motor, not shown), a section of the reel strip 123 becomes visible to a player of the wagering machine 10 revealing various symbols.

The divider 130 may contain an additional plurality of payline light sources (not shown) that indicate positions of payline sections for paylines that span across multiple reel assemblies 120 (as detailed in regard to FIG. 3). In one embodiment, a divider 130 is positioned on each side of each rotatable reel basket 125 enabling the indications of paylines across any number of adjacent reel assemblies 120. Further, the divider 130 may include side-mounted light sources (not shown) projecting light directly at the flat edge of the reel basket 125 adjacent to the divider 130 illuminating the visible edges of the reel basket 125. That is, a divider 130 may include one or more light boards that projects light directly at the adjacent rim from outside the basket 125. Alternatively or in combination, the light board 150 may have one or more light sources projecting light directly at the adjacent rims from inside the basket 125. The light board 150 may also include a set of light sources (not shown) to illuminate the symbols revealed by the reel strip 123 of the rotating basket 125 from behind.

Figure 5:
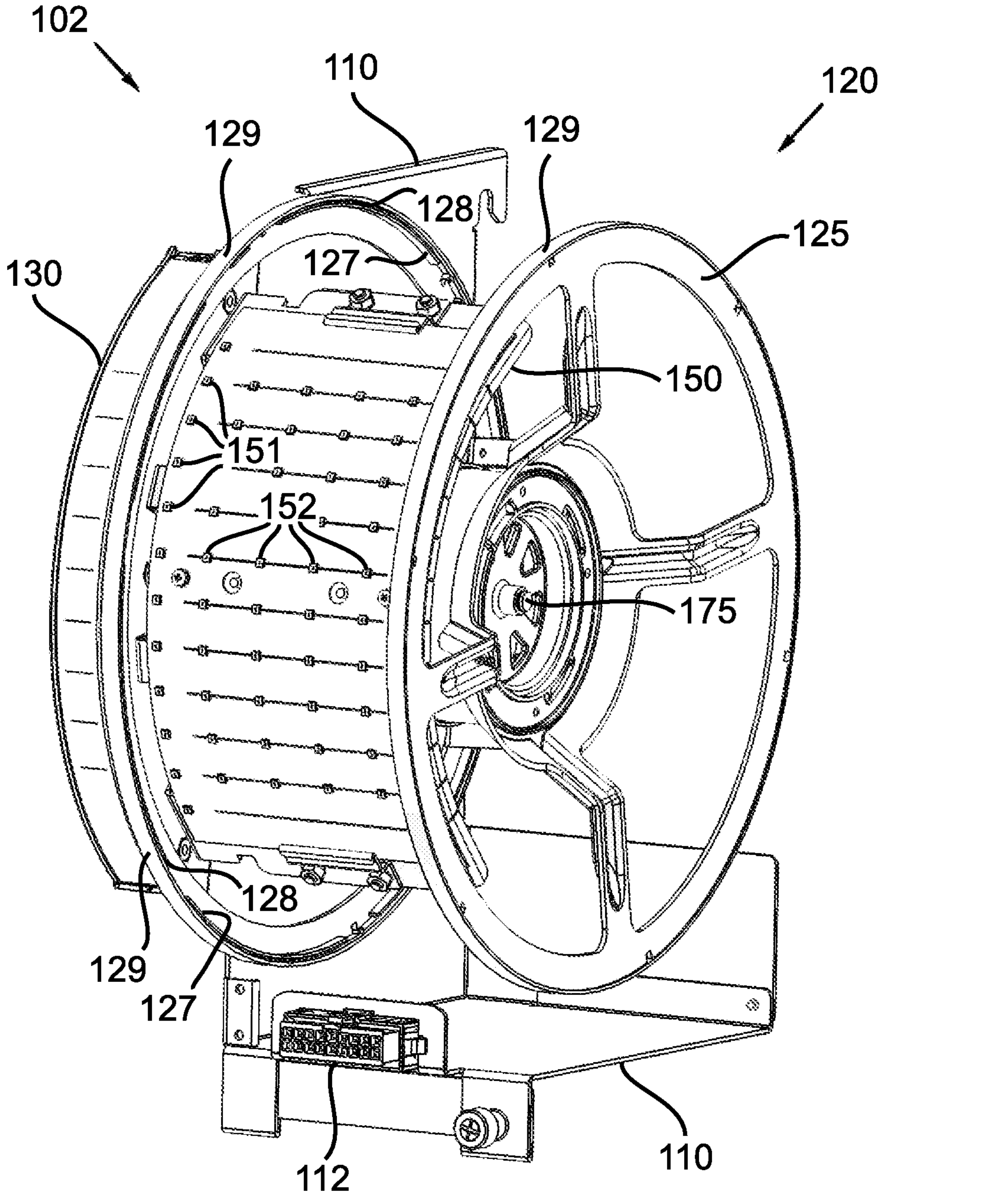
FIG. 5 is a perspective view of a modular reel mechanism of a gaming machine with the reel strip removed revealing a light board, according to an embodiment of the present invention.

Referring now to FIG. 5, a perspective view of a modular reel mechanism 102 having the reel strip 123 removed exposing an underlying light board 150 is shown in accordance with one embodiment. The reel mechanism 102 includes a frame 110, wherein a reel assembly 120, a divider 130, and a light board 150 are affixed to the frame 110. The light board 150 includes a plurality of (outboard) rim light sources 151 and a plurality of (inboard) symbol light sources 152. In one embodiment, the inboard rim light sources 151 and the outboard symbol light sources 152 are positioned inside the basket 125 on a single light board 150. The light board 150 remains stationary as the basket 125 rotates along the axis of rotation defined by the shaft 175. A motor (not shown) is configured to drive the basket 125 to rotate about the shaft 175.

On each side edge of the reel basket 125, the basket 125 has an internal member 127 (inside rim) and an external member 129 (outside rim). A thin channel 128 is formed between the internal member 127 and the external member 129. Each edge of the reel strip 123 is positioned within the channel 128. The reel strip 123 is affixed to the basket 125 such that the reel strip 123 moves as the basket 125 rotates about the axis of rotation defined by the shaft 175. The reel strip 123 may be affixed to the basket 125 by pins, hooks, fasteners, etc., coupling the reel strip 123 to the internal member 127, the channel 128, the external member 129, or any other part of the basket 125. In one embodiment, the external member 129 is the only portion of the basket 125 that is visible to the player of the gaming machine 10 through the primary display 18. The remainder of the basket 125 and its internal components are shielded from view by the reel strip 123.

The rotating reel basket 125 may be fabricated from a number of different materials. For example, basket 125 may be fabricated from metal, plastic, or a combination of both. In one embodiment, the basket 125 is made from a translucent, light-diffusing, plastic material. Other embodiments may incorporate portions of the basket 125, including the internal member 127 and the external member 129, at least partially composed of a transparent material, a transparent material with an applied surface treatment, or any type of light diffusing material (e.g., diffusive polycarbonate) that can be formed to the required shape(s). For example, in one embodiment, the internal member 127 is constructed from a light-transmissive material while the external member 129 is constructed from a light-diffusing material. Any combination of materials, treatments, configurations in this context are within the spirit and scope of the invention.

The rim light sources 151 are positioned at the edges of the light board 150 and illuminate the internal member 127 of the basket 125. The rim light sources 151 may be considered outboard light sources due to their relative position on the light board 150. In one embodiment, light from the rim light sources 151 propagates through the material of the basket 125 via the internal member 127, the channel 128 (and edge of the corresponding reel strip 123), and the external member 129. The edge portion(s) of the reel strip 123 that light passes through on the way to the external member 129 is light-transmissive, and may be clear, lightly-colored, or tinted. As light from the rim light sources 151 is absorbed by the internal member 127, the light-transmissive nature of the basket 125 to propagate light through the internal member 127 to the external member 129 to be diffused prior to emission from the basket 125. The external member 129 may also be illuminated by the rim light sources 151 while the basket 125 is rotating.

In another embodiment, a separate light board housing the rim light sources 151 is positioned outside the basket 125 as a component of the divider 130. Alternatively, the rim light sources 151 may be positioned anywhere proximal to the edge and rims of the basket 125 such that light is propagated to the external member 129. Each divider 130 may have one or more light sources that indicate paylines, illuminate the edges and/or rims of the basket 125, in addition to any other proximal component of the gaming machine 10. Further, a single divider 130 may have one or multiple light boards having multiple lighting components such that the divider 130 includes multiple rim light sources 151 respectively illuminating the edge and rims of multiple adjacent baskets 125. The divider 130 may further include a set of dedicated payline indicator light sources that do not directly illuminate the edge or rims of either adjacent basket 125 (for example, one or more light sources that illuminate symbols or markings of a specific display region of the divider 130).

In one embodiment, the symbol light sources 152 are centrally located in relation to the basket 125 to illuminate symbol-bearing region(s) of the reel strip 123. The symbol light sources 152 may be considered inboard light sources due to their relative position on the light board 150. The symbol light sources 152 are positioned internal to (inside) the basket 125 to backlight region(s) the reel strip 123. When the reel strip 123 is affixed to the basket 125, the symbol light sources 152 illuminate the reel strip 123 from behind, revealing and/or highlighting symbols to the player.

The placement of the rim light sources 151 and the diffusive nature of the rotating reel basket 125 allows each external member 129 of the reel basket 125 to be illuminated (via the corresponding edge and/or internal member 127) separately from the rest of the reel basket 125. This allows the ability to provide isolated lighting for enhanced aesthetics and/or simulated reel rotational velocity. That is, the proximal placement of the rim light sources 151, combined with computerized illumination control, enable the external member 129 at the edge of each reel basket 125 to be independently illuminated in a variety of ways to improve overall appearance and simulated motion of the reels. For example, illumination of each reel's external member 129 may be separately controlled, enabling illusions of individual or collective reel motion (forward and/or backward) for each reel in the gaming machine 10 even as the reels remain stationary.

In prior art mechanical reels, the reel basket 125 is designed to hide the edges of the basket as much as possible. The use of a light-diffusing reel basket 125 having edges and rims that absorb and diffuse light enables various lighting aesthetics and effects not achievable prior. Thus, the reel baskets 125 become an aesthetic and functional feature of the reels, not simply a support for the reel strip 123. The computerized control of individual lighting components (e.g., LEDs) of the light sources 151, 152 may also be coordinated to activate independent and/or specific clustering of lighting components specifically for game events, attract sequences, etc.

Figure 6:
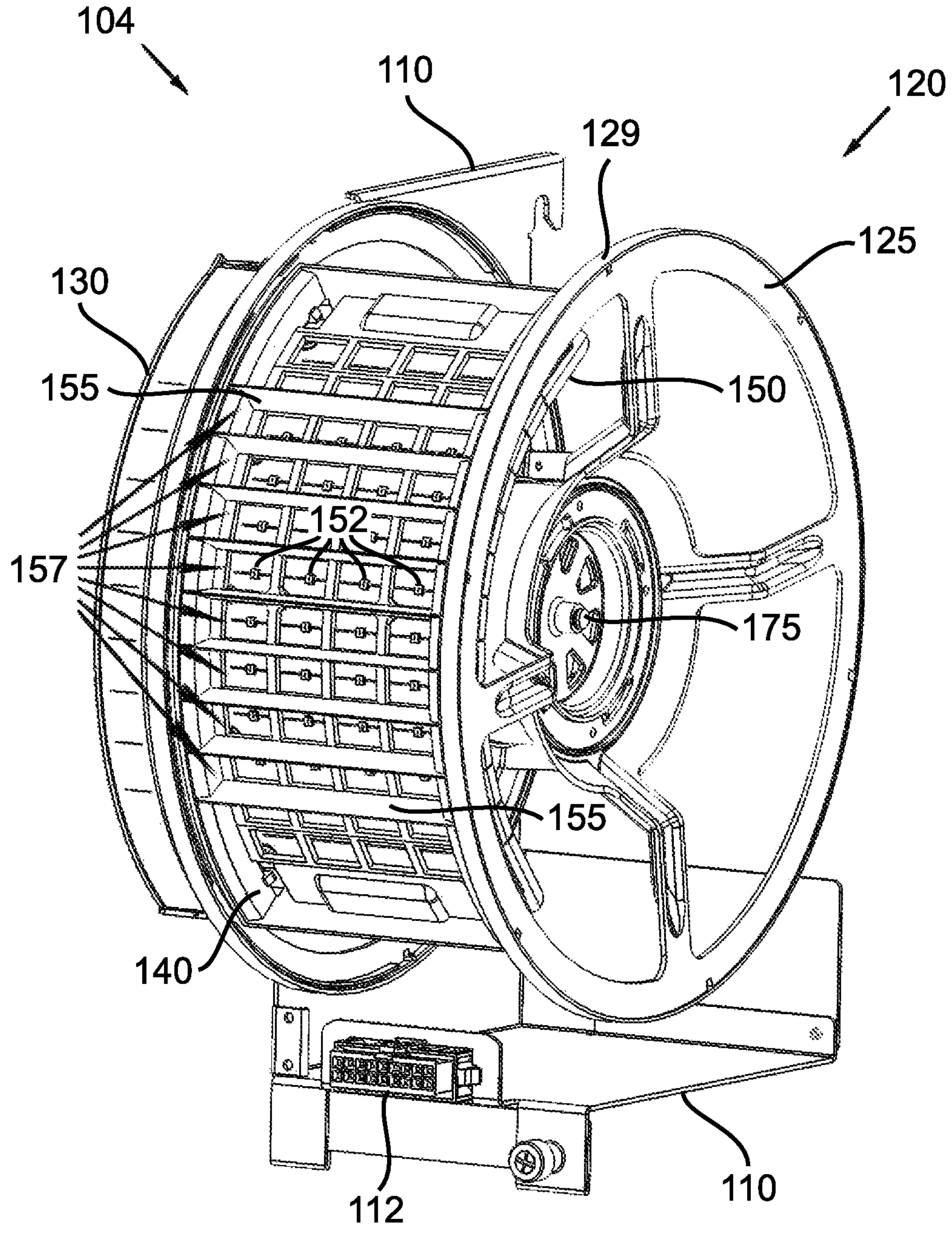
FIG. 6 is a perspective view of a modular reel mechanism of a gaming machine with the reel strip removed revealing a light board equipped with light cups, according to an embodiment of the present invention.

Referring now to FIG. 6, a perspective view of a modular reel mechanism 104 having an exposed light board 150 is shown in accordance with one embodiment. The reel mechanism 104 includes a frame 110, wherein a reel assembly 120, a divider 130, and a light board 150 are affixed to the frame 110. The light board 150 includes a plurality of symbol light sources 152 positioned inside the basket 125. The light board 150 remains stationary as the basket 125 rotates along the axis of rotation defined by the shaft 175 driven by a motor (not shown). A plurality of rim light sources 151 (not shown) may be positioned adjacent to the plurality of symbol light sources 152 on the light board 150, inside or integrated into the divider 130, or mounted to the cabinet, chassis, or housing of the containing gaming machine 10. The plurality of rim light sources 151 projects light toward light-transmissive sections of the basket 125 to illuminate the edge and/or members 127, 129.

The reel mechanism 104 further includes a light shield 140 that is positioned along the internal member 127 between the rim light sources 151 (not shown) and the symbol light sources 152. A corresponding light shield 140 is mounted to each edge of the light board 150. A plurality of light shield dividers 155 extend between each light shield 140, positioned to create a plurality of light cups 157 to direct light from the symbol light sources 152 to the reel strip 123, when attached. In one embodiment, the light cups 157 are horizontally orientated, positioned between the light board 150 and the reel strip 123. Each horizontal light cup 157 directs light from a portion of the plurality of inboard symbol light sources 152 to backlight the symbol-bearing regions of the reel strip 123.

The light shield 140 serves to inhibit the light from the rim light sources 151 from illuminating the symbol-bearing region of the reel strip 123 and reflect light from the rim light sources 151 toward the internal member 127. The light shield 140 also serves to inhibit the light from the symbol light sources 152 from illuminating areas other than the symbol-bearing region of the reel strip 123, (including direct illumination of the internal member 127). The dividers 155 are designed and used to create light cups 157 that collect and direct the light from the symbol light sources 152, in a direct fashion, to illuminate from behind the symbol-bearing region of the reel strip 123. The light cups 157 may also be positioned to control illumination for specific portion(s) of the reel strip 123 in conjunction with selectively activation of particular lighting components (e.g. LEDs) of the symbol light sources 152.

Figure 7:
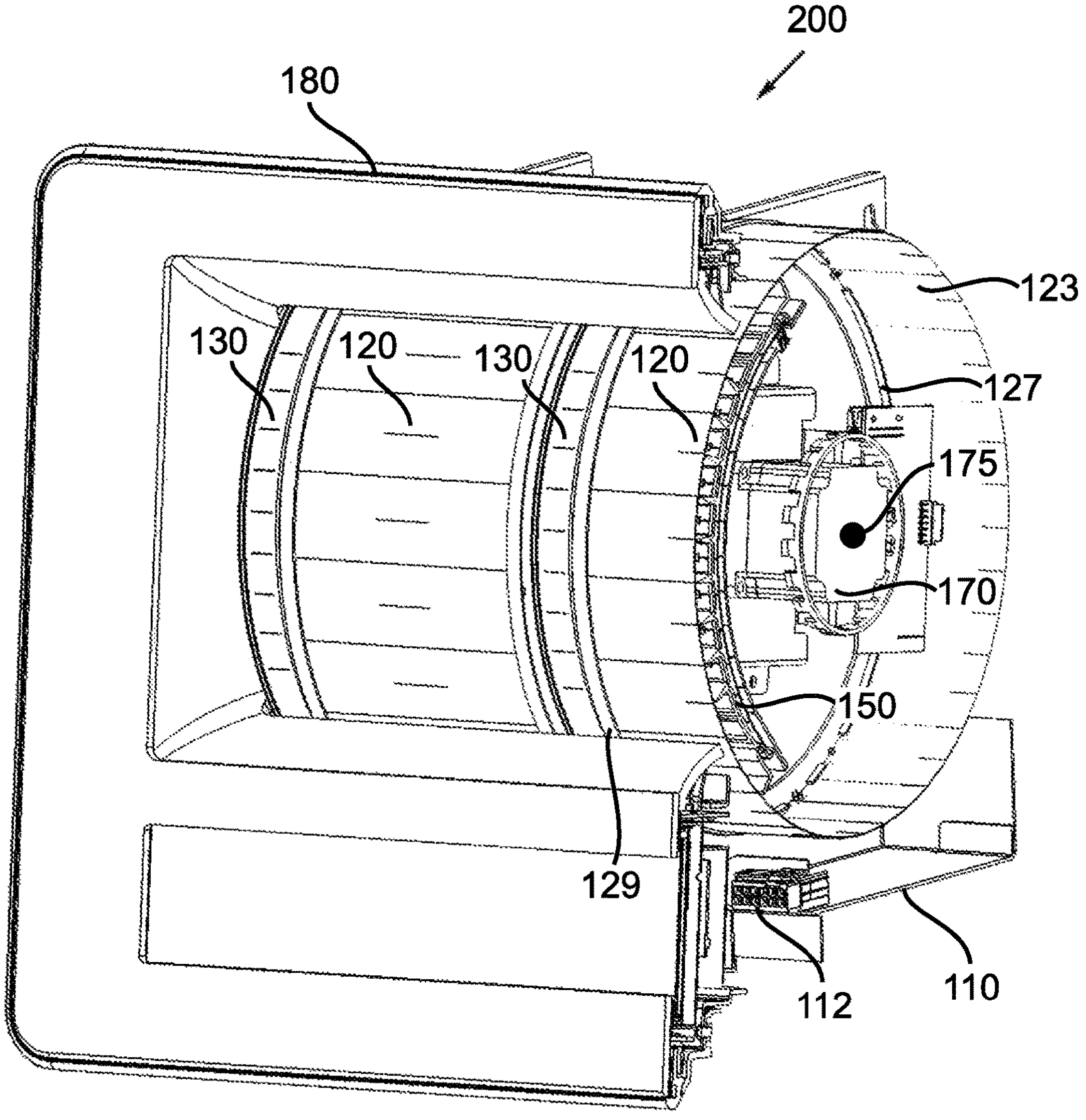
FIG. 7 is a perspective cutaway view of a reel mechanism assembly of a gaming machine having plural modular reel mechanisms, according to an embodiment of the present invention.

Referring to FIG. 7, a perspective cutaway view of a reel mechanism assembly 200 of a gaming machine having plural modular reel mechanisms of a gaming machine is illustrated, according to one embodiment. The reel mechanism assembly 200 includes a set of reel assemblies 120, a set of dividers 130, a gaming-machine display bezel 180, and an electronically controlled electric motor 170.

The light projecting from the light sources mounted on the light board 150 (in addition to any others) illuminate various portions of the reel mechanism assembly 200. The bezel 180 shields the various internal components of the gaming machine 10 from the player view through the primary display 18. The set of reel assemblies 120 rotate under control of the motor 170 around a common axis of rotation defined by the aligned shafts 175.

The set of dividers 130 remain in place and are controlled electronically to highlight or specify the paylines of the wagering game using component light sources mounted on light board(s) (not shown). The dividers 130 may further include one or more light boards, each having one or more light sources thereon, directly illuminating the rim of an adjacent basket 125. The lighting components of the dividers 130 may be configured to specify sets of symbol positions indicating paylines at the front of the divider 130, in addition to one or both sides of the divider 130 illuminating the rim of each adjacent basket 125 as the basket rotates. The lighting components of the dividers 130 may also be electronically programmed and controlled to change or improve the aesthetics of the primary display 18 during and in-between spins.

During the wagering game, generated random numbers may be used to determine reel stop values for each reel assembly 120 used to display a wagering game outcome. The outcome is made up of a set of symbols displayed by the corresponding reel strips 123 of the reel assembly 120 based upon the corresponding reel stop value determined for the assembly 120. The lighting components of the dividers 130 may be used to report individual payline outcomes to the player via the primary display 18, with or without coordination with selective symbol light sources 152 mounted on the light board 150.

Figure 8:
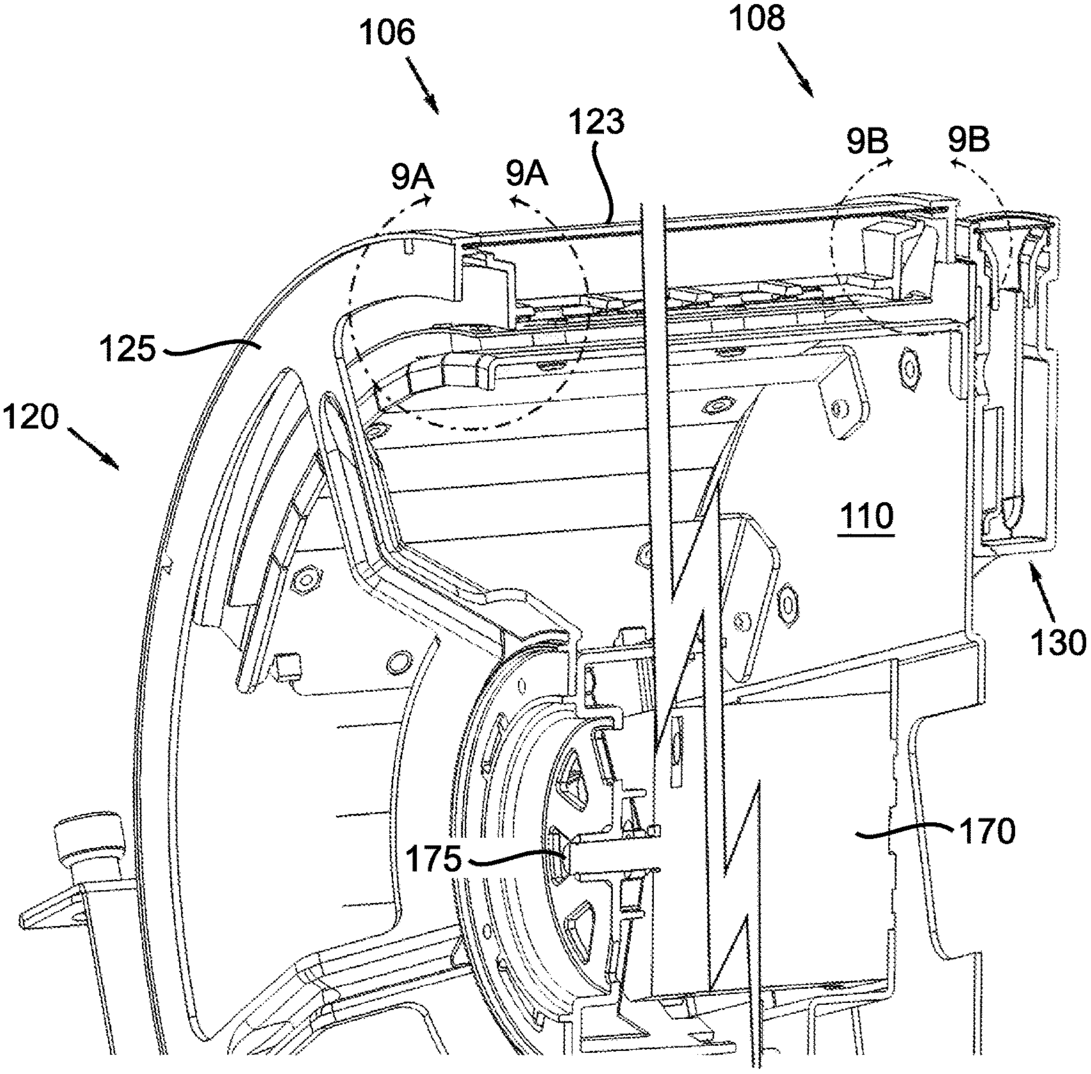
FIG. 8 is a cutaway view of a modular reel mechanism of a gaming machine illustrating two configurations, according to embodiments of the present invention.
Figure 9A:
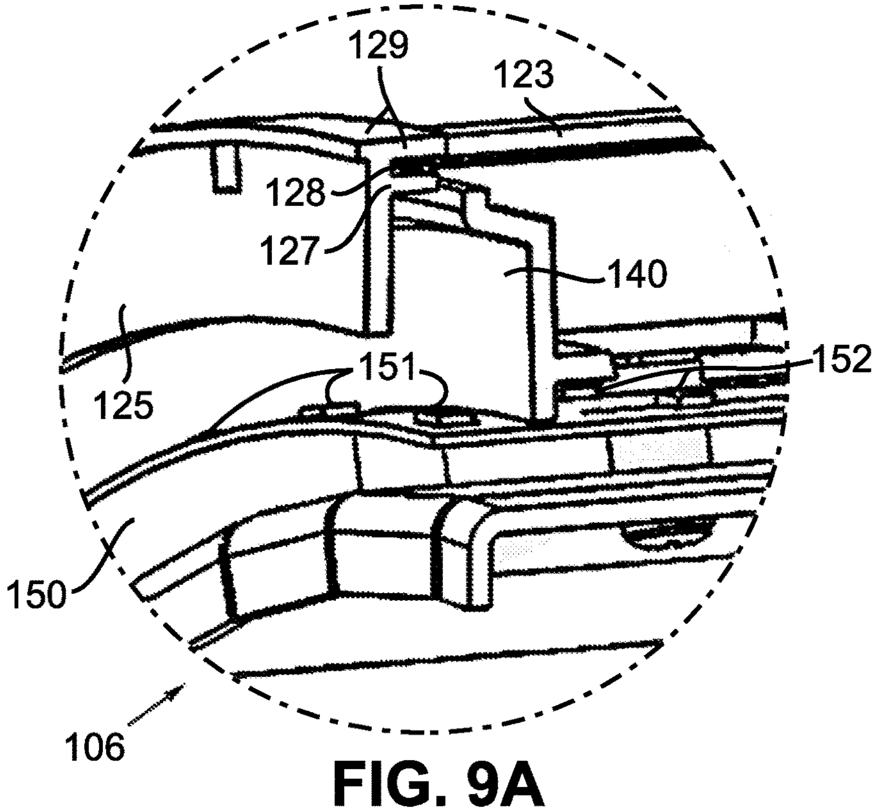
FIG. 9A is a detail view of the portion 9A-9A in FIG. 8 illustrating a reel mechanism of a gaming machine utilizing a light shield, according to an embodiment of the present invention.
Figure 9B:
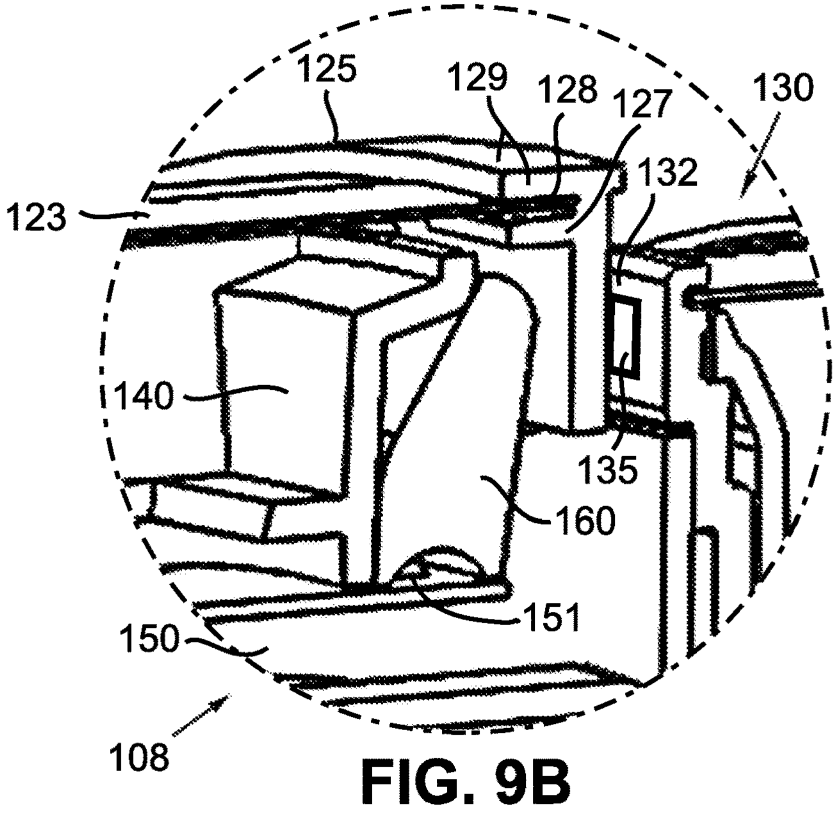
FIG. 9B is a detail view of portion 9B-9B in FIG. 8 illustrating a reel mechanism of a gaming machine utilizing a light shield having a light guide, according to an embodiment of the present invention.
Figure 10:
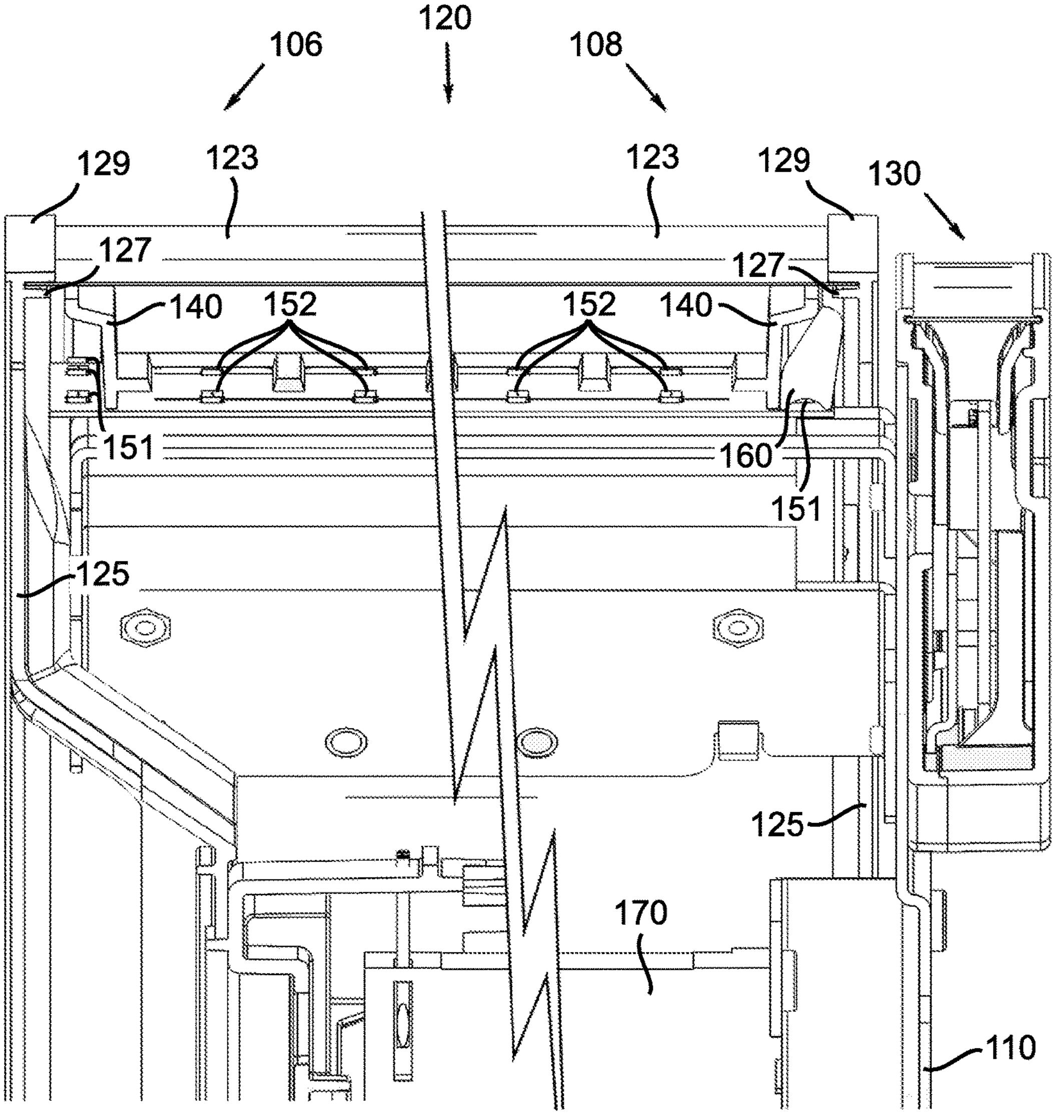
FIG. 10 is a straight-on perspective cutaway view of a modular reel mechanism of a gaming machine illustrating two configurations, according to embodiments of the present invention.

Referring now to FIGS. 8-10, FIGS. 8 and 10 illustrate cutaway views of sections of a reel assembly 120 illustrating two distinct reel mechanisms 106 and 108 (shown side-by-side), according to differing embodiments of the invention. FIG. 10 is a straight-on perspective cutaway view of the reel assembly 120 illustrating sections of the reel mechanisms 106 and 108. FIG. 9A is a detail view of the region 9A-9A in FIG. 8 and illustrates the reel mechanism 106 utilizing a light shield 140 as described above. FIG. 9B is a detail view of the region 9B-9B in FIG. 8 and illustrates the reel mechanism 108 utilizing a light shield 140 in conjunction with a light guide 160, that is described later in this paper. The reel mechanisms 106 and 108 both include a frame 110, wherein a reel assembly 120, a divider 130, a light shield 140, a light board 150, and a motor 170 are affixed to the frame 110.

The difference between the two reel mechanisms 106, 108 includes the presence of a light guide 160 as shown in configuration 108. The light guide 160 is a light-directing pipe that collects and transmits light (e.g., via propagation and internal reflection) from one or more light sources directly toward the edge of the reel basket 125. A modular reel mechanism (e.g., reel mechanism 100) may be equipped with either of the two differing configurations of components shown for mechanisms 106, 108 on one or both sides; either or both of the configurations of the mechanisms 106, 108 are possible on a modular reel mechanism. For example, a reel mechanism 100 may have both edges of the reel basket 125 configured identically, or edges of the reel basket 125 may have differing configurations as shown in mechanisms 106 and 108. The presence of the light guide 160 of configuration 108 (and reflective light shield 140) provides a way to increase the amount of light collected, absorbed, transmitted, and delivered to the internal member 127, thereby increasing light emitted by the external member 129 following light propagation through the basket 125.

The reel assembly 120 includes a rotatable cylindrical basket 125 having a symbol-bearing reel strip 123 rigidly affixed thereto. On each side edge of the reel basket 125, the basket 125 has an internal member 127 and an external member 129. A thin channel 128 is formed between the internal member 127 and the external member 129 that houses the symbol-bearing reel strip 123. That is, each edge of the reel strip 123 is positioned within a channel 128 of the reel basket 125. The reel strip 123 is affixed to the basket 125 such that the reel strip 123 moves as the basket 125 is driven by the motor 170 to rotate about the axis of rotation defined by the shaft 175. The reel strip 123 may be affixed to the basket 125 by pins, hooks, fasteners, etc., as discussed prior. The use of diffusive polycarbonate reel baskets 125 allows for back lighting of the reel basket 125 surface that is visible to the player, i.e., the external member 129.

In one embodiment, the light board 150 includes a plurality of rim light sources 151 and a plurality of symbol light sources 152 positioned inside the basket 125 and on opposite sides of the light shield 140. In this embodiment, the light board 150 is curved, enabling full, uniform lighting of the symbols of the reel strip 123 using light emitting diodes (LEDs) that consume little power. The curved design of the light board 150 allows for more uniform lighting than traditional setups using multiple boards. The full-array curved LED light board 150 illuminates the entire viewable area of the reel strip 123, not just the winning symbols, allowing for brighter and more attractive attention-getting reels. Further, the curved design of the light board 150 minimizes electrical connection and radiated emissions caused by the necessary electrical harness wiring. The full array pattern of lights also creates the possibility for greater lighting control, for example, controlling light for partial sections of a reel symbol on the reel strip 123.

In another embodiment, one or more light boards include the rim light sources 151 positioned inside the divider 130, outside the reel basket 125. One or more windows 135 are positioned in the side-face 132 of the divider 130 enabling light from the rim light sources 151 to directly illuminate the rim of the reel basket 125 via the outside edge. The light from the rim light sources 151 passes through the windows 135 in the divider 130 and strikes the light-diffusing reel basket 125 where the light is propagated to the external member 129. Thus, the external member 129 can be illuminated by the rim light sources 151 that are positioned inside the divider 130 and outside the reel basket 125. In one embodiment, a divider 130 would have windows 135 on both sides through which light from the rim light sources 151 would emit to illuminate the respective adjacent rims of a reel basket 125. For example, in some embodiments, the windows 135 enable light from the rim light sources 151 (or additional lighting elements) to be aimed directly at the reel basket 125 for propagation to the external member 129. Light from the external member 129 appears to illuminate the external member 129 and basket 125 from inside, even though the source of the light may not be interior to the basket 125.

In one embodiment, the configuration of the light boards in the divider 130 housing lighting components may include an arched light board housing centrally located payline indicators (e.g., LEDs 87) and multiple sets of the rim light sources 151 (e.g., one each side of the divider 130). Alternatively, multiple flat light boards having multiple rim light sources 151 may be used within each divider 130, positioned to illuminate the various components observed in the visual field of the primary display 18 including the reel strip 123, the reel basket 125, and edges of display 18. Another embodiment may rely on light-diffusing portions of the divider 130 to propagate light to the reel basket 125, for example, perhaps from a light board in the lower section of the divider 130.

The use of the rim light sources 151 (and coordinating windows 135) within a divider 130 may be used in conjunction with, or independently from, other components. For example, additional rim light sources 151 on one or more light boards 150 positioned inside the reel basket 125, a light shield 140 and/or light guide 160 may help to generate, direct, or contain light intended to be illuminated by the external member 129. Likewise, light striking the reel basket 125 being re-emitted at the external member 129 may originate from any location proximal to the reel basket 125 and any type of rim light source 151 may be employed.

Additionally, dancing or chasing lighting effects behind the reel symbols of the reel strip 123 may be achieved across the entire visual field of the primary display 18. Light sources may be individually controlled allowing for tracing and various special effects to occur along the surfaces of the reel basket 125. Since computer-controlled LEDs can start and stop with a greater degree of control than a physical reel basket, the player can be tricked into thinking the reel basket 125 is stopping and starting in the same manner. Alternatively, uniform LED lighting provides provision for solid colors across all reels, tracing lights, reverse tracing lights to simulate faster reel movement, reel highlighting in a multiple reel setup (e.g., one reel basket 125 is illuminated a different color than the rest), special effects (e.g., bouncing or faster starting and stopping), customization of the overall aesthetic of a gaming machine by displaying specific reels of a machine to be a different color from the machine next to it, paylines to be shown (or highlighted) on the reel basket, or any combination of these. Further, reel lighting may be achieved even when the game is not being played (i.e., enhanced attract models).

The light shield 140 is curved, generally conforming to the shape of the reel basket 125 and the light board 150. The light shield 140 is designed to isolate and deflect the light from the light sources 151, 152 to illuminate either the symbol-bearing region of the reel strip 123 or the external members 129 of the reel basket 125, but generally not both from the same light source. That is, a light shield 140 positioned along an internal member 127 of the reel basket 125 serves to illuminate the internal member 127 with a first light from the rim light sources 151 and illuminate the symbol-bearing region of the reel strip 123 with a second light from the symbol light sources 152 by inhibiting light bleed into the undesirable areas. Thus, an effective light shield 140 is highly reflective and positioned in relation to the light sources 151, 152 to inhibit the first light from the rim light source 151 from illuminating a symbol-bearing region of the reel strip 123. In short, the light shield 140 uses reflective surfaces to direct light onto the surface of the external member 129 of the reel basket 125 via the internal member 127. Also, the light shield 140 acts as a wall between the rim light sources 151 and the symbol light sources 152, creating a physical mask allowing the external member 129 to illuminate without light bleeding into the surface of the reel strip 123.

Further, the light guide 160 displayed in configuration 108 is constructed to help direct a maximum amount of light from the rim light sources 151 to the internal member 127. The light guide 160 enables light to travel straight through the light guide 160 from the rim light sources 151 to the internal member 127 of the reel basket 125, in addition to refracting and reflecting stray light from the rim light sources 151 to the internal member 127. That is, the light guide 160 enables light from the rim light sources 151 to both internally reflect en route to the internal member 127, as well as redirecting any light escaping the light guide 160 to travel toward the internal member 127.

An edge of the reel strip 123 is positioned inside a channel 128 located between the internal member 127 and the external member 129. The light from the rim light sources 151 that reaches the internal member 127 passes through the internal member 127, the channel 128, the edge of the reel strip 123 positioned and secured in the channel 128, and the external member 129 where the light is diffused by the reel basket 125 at the exterior surface of the external member 129. Thus, the internal member 127 and the edge of the reel strip 123 are composed of a light-transmissive material allowing the light from the rim light sources 151 to pass there through and reach the light-diffusing external member 129 prior to becoming visible to an observer of the reel basket 125 (e.g., a player).

In one embodiment, the rotatable cylindrical reel basket 125 has a light shield 140 on either edge of the reel basket 125, each light shield 140 positioned along and inside a first and second opposing light-diffusing external member 129, a symbol-bearing reel strip 123 extending between the rims. Each edge of the reel basket 125 has a set of rim light sources 151 that provides light passing through the corresponding internal member 127, edge of the reel strip 123, and external member 129, to be diffused at the external surface of the external member 129. A set of symbol light sources 152 illuminate the symbol-bearing region of the reel strip 123 between the opposing light shields 140. Each light shield 140 inhibits light from the rim light sources 151 from illuminating the symbol-bearing region of the reel strip 123.

Thus, a reel assembly 120 includes a pair of light shields 140 configured such that a first light from a first set of rim light sources 151 illuminates a first external member 129, a second light from a set of symbol light sources 152 illuminate a symbol-bearing region of the reel strip 123, and a third light from a second set of rim light sources 151 illuminates a second external member 129. The first and second light shield 140 inhibits the light from the first and second set of rim light sources 151, respectively, from illuminating the symbol-bearing region of the reel strip.

In one embodiment, a light guide 160 is positioned between the set of rim light sources 151 and the internal member 127, configured to transmit the rim light there between.

In one embodiment, a motor 170 and a shaft 175 are positioned such that the shaft 175 defines an axis of rotation of the cylindrical basket 125. A rim light source 151 is arranged to illuminate an external member 129 with the first light while the motor causes the basket 125 to rotate about the shaft 175.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A reel mechanism for a gaming machine, comprising:

a rotatable cylindrical basket including first and second opposing light-diffusing rims and a symbol-bearing reel strip extending between the rims;

a set of first rim lights arranged to illuminate the first light-diffusing rim;

a set of symbol lights arranged to illuminate a symbol-bearing region of the reel strip; and a stationary light shield positioned between the set of first rim lights and the set of symbol lights, the light shield arranged to isolate the first rim lights and the first rim from the symbol lights and the symbol-bearing region of the reel strip.

2. The reel mechanism of claim 1, further including:

a set of second rim lights illuminating the second light-diffusing rim; and a stationary second light shield positioned between the set of second rim lights and the set of symbol lights, the light shield arranged to isolate the second rim lights and the second rim from the symbol lights and the symbol-bearing region of the reel strip.

3. The reel mechanism of claim 1, wherein the first rim lights are positioned inside the basket.

4. The reel mechanism of claim 1, wherein the first rim lights and the symbol lights include light-emitting diodes (LEDs) mounted to one or more curved light boards conforming to a portion of the cylindrical basket visible to a player of the gaming machine.

5. The reel mechanism of claim 1, wherein the first rim includes internal and external members arranged to define a channel therebetween, an edge of the reel strip being secured within the channel, and wherein the internal member and the edge of the reel strip are composed of a light-transmissive material allowing light from the first rim lights to pass therethrough to the external member, the external member being composed of a light-diffusing material.

6. The reel mechanism of claim 1, further including a light guide positioned between the first rim lights and the first rim and configured to collect and transmit light therebetween.

7. The reel mechanism of claim 1, further including a motor and a shaft, the shaft being positioned along an axis of rotation of the cylindrical basket, wherein the first rim lights are arranged to illuminate the first rim during rotation of the cylindrical basket about the shaft driven by the motor.

8. A reel mechanism for a gaming machine, comprising:

at least one reel basket rotatable about an axis of rotation, the basket including a rim and a symbol-bearing reel strip, the rim including a light-transmissive internal member and a light-diffusing external member, the reel strip having an edge affixed within a channel defined between the internal member and the external member;

at least one light board including a plurality of outboard light sources and a plurality of inboard light sources, the plurality of inboard light sources arranged to illuminate a symbol-bearing region of the reel strip, the plurality of outboard light sources arranged to illuminate the external member via the internal member and the edge of the reel strip; and a basket-edge light shield positioned between the plurality of inboard light sources and the plurality of outboard light sources, the light shield inhibiting light from the plurality of outboard light sources from illuminating the symbol-bearing region of the reel strip.

9. The reel mechanism of claim 8, wherein the inboard light sources and the outboard light sources include light-emitting diodes (LEDs) mounted to one or more of the at least one light board and extending along an arc conforming to a portion of the at least one reel basket visible to a player of the gaming machine.

10. The reel mechanism of claim 9, wherein the at least one light board includes the outboard light sources positioned inside the basket.

11. The reel mechanism of claim 8, further comprising:

a light guide positioned between the plurality of outboard light sources and the internal member, the light guide directing the light from the plurality of outboard light sources toward the internal member.

12. The reel mechanism of claim 8, further comprising:

a plurality of horizontal light cups positioned between the light board and the reel strip, each horizontal light cup directing light from a portion of the plurality of inboard light sources to enhance backlighting for a specific symbol-bearing region of the reel strip.

13. The reel mechanism of claim 8, further comprising:

a plurality of payline indicators each having thereon a plurality of payline light sources arranged for visibly highlighting selective combinations of symbols on the symbol-bearing reel strips of the at least one reel basket.

14. A regulated casino gaming machine primarily dedicated to playing at least one casino wagering game, comprising:

a gaming cabinet; and a plurality of reel mechanisms housed within the cabinet, each reel mechanism comprising:

a rotatable cylindrical basket including first and second opposing light-diffusing rims and a symbol-bearing reel strip extending between the rims;

a set of first rim lights arranged to illuminate the first light-diffusing rim;

a set of symbol lights arranged to illuminate a symbol-bearing region of the reel strip; and a stationary light shield positioned between the set of first rim lights and the set of symbol lights, the light shield arranged to isolate the first rim lights and the first rim from the symbol lights and the symbol-bearing region of the reel strip.

15. The gaming machine of claim 14, wherein each reel mechanism further includes:

a set of second rim lights arranged to illuminate the second light-diffusing rim; and a stationary second light shield positioned between the set of second rim lights and the set of symbol lights, the light shield arranged to isolate the second rim lights and the second rim from the symbol lights and the symbol-bearing region of the reel strip.

16. The gaming machine of claim 14, wherein the first rim lights are positioned inside the basket.

17. The gaming machine of claim 14, wherein each of the first rim lights and the symbol lights include light-emitting diodes (LEDs) mounted to one or more curved light boards conforming to a portion of the cylindrical basket visible to a player of the gaming machine.

18. The gaming machine of claim 14, wherein the first rim includes internal and external members arranged to define a channel therebetween, an edge of the reel strip being secured within the channel, and wherein the internal member and the edge of the reel strip are composed of a light-transmissive material allowing light from the first rim lights to pass therethrough to the external member, the external member being composed of a light-diffusing material.

19. The gaming machine of claim 14, wherein each reel mechanism further includes a light guide positioned between the first rim lights and the first rim and configured to collect and transmit light therebetween.

20. The gaming machine of claim 14, wherein each reel mechanism further includes a motor and a shaft, the shaft being positioned along an axis of rotation of the cylindrical basket, wherein the first rim lights are arranged to illuminate the first rim during rotation of the cylindrical basket about the shaft driven by the motor.

* * * * *